United States Patent [19]

DuBois et al.

[11] Patent Number: 5,248,760

[45] Date of Patent: Sep. 28, 1993

[54] CHEMICALLY CURED LOW TEMPERATURE POLYIMIDES

[75] Inventors: Thomas D. DuBois; Farid M. Tranjan, both of Charlotte; Stephen M. Bobbio, Wake Forest, all of N.C.

[73] Assignees: UNC at Charlotte, Charlotte; MCNC, Research Triangle Park, both of N.C.

[21] Appl. No.: 646,362

[22] Filed: Jan. 25, 1991

[51] Int. Cl.$^5$ .................... C08G 69/26; C08G 73/10
[52] U.S. Cl. .................................. 528/353; 528/45; 528/48; 528/50; 528/125; 528/126; 528/128; 528/129; 528/170; 528/173; 528/179; 528/183; 528/185; 528/188; 528/189; 528/220; 528/222; 528/229; 528/342; 528/351; 427/379; 427/385.5
[58] Field of Search ............... 528/45, 48, 50, 353, 528/351, 125, 126, 128, 129, 170, 173, 188, 183, 185, 189, 220, 229, 222, 342, 179; 427/379, 385.5

[56] References Cited

U.S. PATENT DOCUMENTS

| | | | |
|---|---|---|---|
| 3,511,728 | 5/1970 | Freedman et al. | 156/52 |
| 3,528,950 | 9/1970 | Lubowitz | 528/353 |
| 3,666,723 | 5/1972 | Kray et al. | 528/125 |
| 3,715,293 | 2/1973 | Sandner et al. | 430/923 |
| 3,801,329 | 4/1974 | Sandner et al. | 430/923 |
| 3,839,529 | 10/1974 | Serres et al. | 430/923 |
| 3,846,269 | 11/1974 | Martello et al. | 430/923 |
| 3,894,330 | 7/1975 | Bellis | 228/254 |
| 4,019,877 | 4/1977 | Gass et al. | 204/181 |
| 4,110,294 | 8/1978 | Pickering | 528/322 |
| 4,129,570 | 12/1978 | Bilow et al. | 528/128 |
| 4,238,528 | 12/1980 | Angelo et al. | 427/96 |
| 4,338,430 | 7/1982 | Edelman | 528/222 |
| 4,468,411 | 8/1984 | Sloan et al. | 427/8 |
| 4,496,711 | 1/1985 | Landis | 528/125 |
| 4,511,705 | 4/1985 | Makino et al. | 528/26 |
| 4,590,258 | 5/1986 | Linde et al. | 528/189 |
| 4,595,548 | 6/1986 | St. Clair et al. | 528/341 |
| 4,603,061 | 7/1986 | St. Clair et al. | 427/162 |
| 4,643,910 | 2/1987 | Foutz | 427/10 |
| 4,645,688 | 2/1987 | Makino et al. | 528/38 |
| 4,656,235 | 4/1987 | Tesoro et al. | 526/262 |
| 4,749,621 | 6/1988 | Araps et al. | 428/473.5 |
| 4,871,619 | 10/1989 | Araps et al. | 428/473.5 |
| 4,879,182 | 11/1989 | Presswood et al. | 428/408 |
| 4,898,753 | 2/1990 | Inoue et al. | 427/276 |
| 4,931,310 | 6/1990 | Anschel et al. | 427/55 |
| 4,954,601 | 9/1990 | King | 528/45 |
| 4,963,635 | 10/1990 | Kunimune et al. | 528/26 |

FOREIGN PATENT DOCUMENTS 216505 4/1987 European Pat. Off. .
1059929 2/1967 United Kingdom .

*Primary Examiner*—John Kight, III
*Assistant Examiner*—P. Hampton-Hightower
*Attorney, Agent, or Firm*—Bell, Seltzer, Park & Gibson

[57] ABSTRACT

The invention comprises curing polyamic acid solutions into polyimide solutions by adding a hydrophilic reagent to a polyamic acid solution. The hydrophilic reagent is selected to have little or no reactivity with amines or carboxylic acids, and is of the type that will react with water to form by-products that shift the equilibrium between polyamic acid as a reactant and polyimide and water as products toward the production of polyimide.

42 Claims, 1 Drawing Sheet

CHEMICALLY CURED LOW TEMPERATURE POLYIMIDES

FIELD OF THE INVENTION

The present invention relates to processes and products for producing polyimides, and in particular relates to producing highly planarizing polyimides that can be cured at relatively low temperatures that are particularly beneficial for use in microelectronics applications.

BACKGROUND OF THE INVENTION

Polyimides ("PI") are a group of high polymers in which repeating units are connected by imide groups (—$(CO)_2N$—) in the polymer chain. Polyimides have good tensile strength, low water absorption, remain undistorted by heat at temperatures of 260° C. or higher, have a low dielectric constant, and a relatively small coefficient of linear expansion. They also exhibit high temperature stability (up to about 370° C.) excellent frictional characteristics, good wear resistance at high temperatures, radiation resistance, low outgassing under high vacuum, are resistant to organic materials at relatively high temperatures, and are flame retardant. Therefore, polyimides have found a number of uses including high temperature coatings, laminates and composites for aerospace vehicles, ablative materials, oil sealants and retainers, adhesives, semiconductor applications, valve seats, bearings, insulation for cables, printed circuits, magnetic tapes, flame resistant fibers, and binders for abrasive materials; (N. Sax and R. Lewis, *Hawley's Condensed Chemical Distionary*, 11th Ed., 1987).

In the microelectronics or semiconductor industry, polyimides have found a number of applications including the formation of planarizing dielectric films between layers. As known to those familiar with microelectronic integrated circuit (or "chip") manufacturing, the steps used to build up a microelectronic device typically result in a three-dimensional surface pattern of semiconductor materials, insulators and conductors, among other materials. These three-dimensional topographies are often referred to as "geometries" in this art. Although a resulting finished semiconductor device will exhibit such geometries, during manufacturing, when the various layers of materials are being added, there are some processes for which the three-dimensional structure is disadvantageous. In particular, during typical photolithographic steps, a planar surface is much more desirable than a three-dimensional one because of the high optical resolution required during such steps. A uneven surface can lower the resolution of a photolithographic step, while a highly planar one can help increase the resolution. The ability to achieve planar surfaces over varying topography is critical to lithographic steps which require etching small features; i.e. those of about one micron or smaller.

Therefore, one typical step during semiconductor device manufacturing is to add a layer of polyimide which fills in and levels out the geometries, a process referred to as "planarizing." The polyimide, to do the best job of planarizing, is generally added as a film of a solution or suspension in which a high solids content and low viscosity are generally accepted as favoring improved planarization properties. The film is then thermally cured to produce the desired polyimide layer.

In the polymer art, the term "cure" is often used to represent two different process steps. In one sense, "cure" represents the chemical reaction in which particular reactants are used to produce a resulting polymer. An example is the production of polyimide in a solution. The word "cure" is also used, however, to represent the process by which a polymer in solution is formed into a solid polymer, usually by driving off a solvent along with water and other reaction products. An example is the solidification of a polyimide solution into a solid film. In order to distinguish these steps, the solvent removal or similar steps will be referred to herein as a "thermal cure," reflecting the common use of heat to accomplish this step.

As also used herein, the term "film" refers to a very thin liquid coating, usually of a solution, upon a substrate. In the manufacture of microelectronic devices, such films are often applied by applying the solution to a rapidly rotating substrate, a technique that helps form an even film. The technique is accordingly referred to as "spin casting" or "spinning" and the resulting film as a "spun" or "spun cast" film. The term "film," however, generally is used to refer to the coating both in its liquid state and after it has been hardened into a resulting solid.

Typical procedures for preparing polyimide films from spun cast polyamic acid films, however, involve complex processes over extended periods of time with temperatures that reach as high as 400° C. or greater. In some chip manufacturing processes, however, such high temperatures are disadvantageous, particularly with respect to their effects on the other materials present, and the deposit and cure of polyimide at relatively low temperatures would offer significant advantages.

One attempt to deliver polyimide at lower temperatures is to supply polyimide as a low molecular weight polyimide powder dissolved (or redissolved) in one of the common polyimide solvents such as 1-methyl-2-pyrolidinone (NMP). The resulting solution is used in the spinning techniques familiar to those in this art to add polyimide films of a desired thickness. Films formed from these low molecular weight powders dissolved in a solvent or mixture of solvents can be thermally cured at relatively lower temperatures of about 300° C. Unfortunately, however, the mechanical and electrical properties of films formed from such low molecular weight powders are inferior in many respects. They are readily attacked by many common solvents, tend to be susceptible to moisture, exhibit poor adhesion, and have poor dielectric properties.

Alternatively, in order to achieve improved mechanical and electrical properties, the polyimide is best added as a solution of polyamic acid. As used herein, the term "polyamic acid" refers to a polyimide precursor and generally represents a polymer having an amide bonding scheme which, when the amide linkage is dehydrated, will form an imide linkage. Because the amide is supplied in polymeric form, the dehydration step produces polyimide. Films formed from polyamic acid solutions generally demonstrate better mechanical and electrical properties than do films formed from solutions of polyimide powders. Unfortunately the polyamic acid must be subjected to a complex curing process which typically includes a 30 minute treatment at a temperature of about 400° C. or greater to achieve the required imidization or water removal step.

Therefore, investigators have pursued the problem of producing polyimides suitable for microelectronic processes that can be produced or cured at generally lower temperatures. Some of these have included chemical curing of polyimides using phosphorous halide and similar curing agents. These procedures, however, introduce impurities into the resulting polyimide films and produce unusable materials.

Nevertheless, the potential benefits of curing polyimides at lower temperatures are attractive and offer several advantages over redissolving polyimide powder in solvents. First, the molecular weights of polyamic acids tend to be greater than those of redissolved polyimide powders. Thus, by chemically curing polyamic acid the original high molecular weight polyamic acid can be converted into a high molecular weight polyimide. Second, because the chemically cured solutions contain polyimide chains rather than polyamic acid chains, high molecular weight polyimide films spun from these solutions ought be curable at temperatures somewhat lower than that of the conventional curing scheme, depending upon the solvent system. Third, the mechanical and electrical properties of high molecular weight polyimide films are desirable, particularly if they could be made comparable to those formed from the polyamic acid precursor. These would desirably be superior to those of films formed from polyimide solutions prepared by dissolving the low molecular weight PI powder.

Therefore, it is an object of the present invention to provide a method of preparing and curing low viscosity, highly planarizing polyimides at moderate temperatures, and for which the resulting polyimides are resistant to attack from common organic solvents and are particularly suitable for use in microelectronic applications.

In one aspect, the invention is a method of preparing and curing low viscosity, highly planarizing polyimides at moderate temperatures for use in microelectronic applications. In this aspect the invention comprises curing polyamic acid into polyimide by adding a hydrophilic reagent to a polyamic acid solution, and in which the hydrophilic reagent has little or no reactivity with amines or carboxylic acids and that removes the water normally produced by the imidization of polyamic acid to polyimide to thereby encourage the formation of polyimide in the solution. As a result, the associated removal of water drives the polyamic acid dehydration reaction to produce polyimide at moderate temperatures.

In another aspect, the invention is a precursor solution from which a low viscosity, highly planarizing polyimide film can be formed at moderate temperatures.

In yet another aspect, the invention is a method of planarizing the surface of a microelectronic device such as an integrated circuit or its precursor.

In a further aspect, the invention is a precursor for a microelectronic device such as an integrated circuit.

The foregoing and other objects, advantages and features of the invention, and the manner in which the same are accomplished, will become more readily apparent upon consideration of the following detailed description of the invention, taken in conjunction with the accompanying drawings in which:

DETAILED DESCRIPTION

Figure 1:
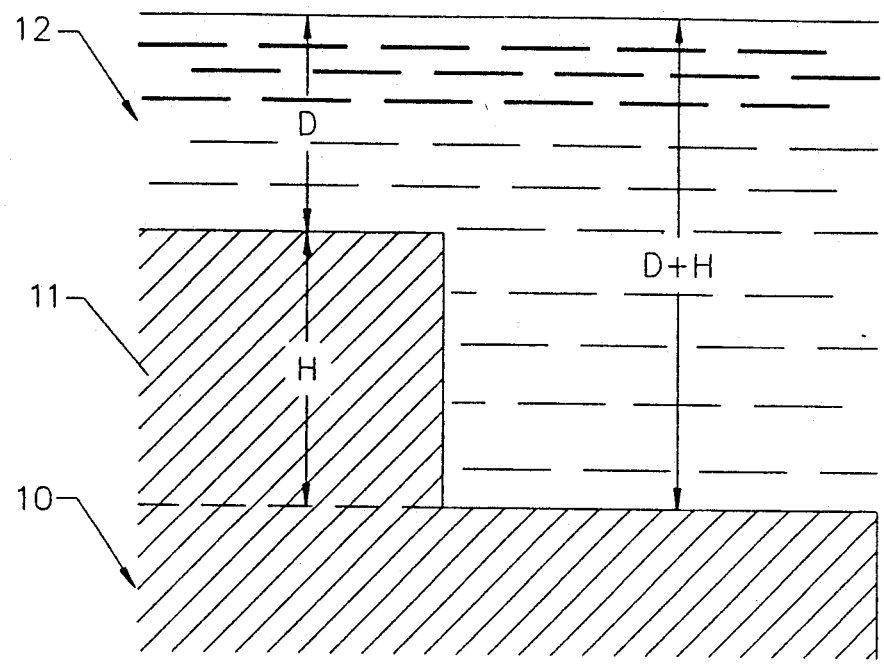
FIG. 1 is a schematic diagram of a substrate and its topography with a solution applied as a film thereto.

The invention is a method of preparing and curing low viscosity, highly planarizing polyimides at moderate temperatures for use in microelectronic applications. The invention comprises curing polyamic acid into polyimide by adding a hydrophilic reagent to a polyamic acid solution. The hydrophilic reagent is selected to have little or no reactivity with amines or carboxylic acids, and is of the type that will remove the water normally produced by the imidization of polyamic acid to polyimide to thereby encourage the formation of polyimide in the solution. In addition to the other advantages set forth herein, polyimide films formed from the invention are more resistant to common solvents than those formed from redissolved polyimides.

Although the inventors do not wish to be bound by any particular theory, one likely reaction mechanism is that the hydrophilic reagents will react with water to form by-products that shift the equilibrium between polyamic acid as a reactant and polyimide and water as products toward the production of polyimide and water. In this respect, the hydrophilic reagent can be qualified by several characteristics that may be present separately or concurrently.

As set forth earlier herein, the imidization of polyamic acid is basically a dehydration reaction As best understood, the amide group in the polyamic acid is generally adjacent to at least one of the acid groups, and some intramolecular hydrogen bonding can occur between the acidic hydrogen and the respective free electron pairs on the nitrogens and oxygens. In the imidization step, the amine hydrogen, the acid hydrogen, and the acid oxygen leave in the form of a water molecule with the amide nitrogen concurrently bonding with a second ketone carbon to form the imide bond. The reaction can be expressed schematically (but not necessarily stoichiometrically) as:

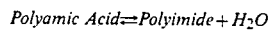

*Polyamic Acid⇌Polyimide+$H_2O$*

It will be understood that this represents a schematic, overall expression of the net imidization reaction and is not intended to represent any or all of the particular steps in the reaction mechanism. Likewise, it will be understood that as imidization proceeds, the equilibrium symbolized above will greatly favor the polyimide product over the polyamic acid reactant.

With the foregoing in mind, in the invention, chemical reagents are selected and used which will in turn react with the water normally produced in equilibrium amounts by the imidization reaction in a manner which shifts the equilibrium toward the production of water and therefore toward the continued imidization reaction.

Therefore, the hydrophilic reagents selected to carry out the reaction are qualified by first having little or no reactivity with either amines or carboxylic acids so that they avoid interfering with the polyamic acid in anything other than the intended dehydration. As used herein, the qualification of little or no reaction with amines or carboxylic acids does not entirely preclude such reactions, but only those of a degree and kind that would otherwise interfere with the production of polyamic acid from its precursors, or with the production of polyimide from polyamic acid.

A next potential characteristic is that an appropriate hydrophilic reagent will react with water to produce a by-product that has a similar or lower boiling point than that of the hydrophilic reagent itself. Using such a reagent, the production of the by-products and the associated absorption of water drives the polyamic acid dehydration reaction to produce polyimide at moderate temperatures. This second qualification means that at any typical given temperature and pressure, the by-product of the reaction of the reagent with the polyamic acid is more likely to be volatile than is the reagent itself. As recognized by those of ordinary skill in the chemical arts, because volatile species tend to leave an immediate reaction environment (rather than remaining in equilibrium), reactions tend to be driven towards production of the more volatile species. Therefore, if the resulting by-products are more volatile than the reagents, the equilibrium of their reaction with water will be driven toward the volatile by-product side. This in turn shifts the polyamic acid-polyimide equilibrium towards the production of polyimide.

In effect, this second qualification can be expressed as three similar qualifications that may be present concurrently or alternatively: that the by-product have a lower boiling point than the hydrophilic reagent; or that the by-product be volatile at temperatures typical for the polymerization of polyimide (in particular those temperatures lower than conventional curing temperatures); or that the by-product be a gas at room temperature or above.

The specific volatility of any species at any given time, however, is also a function of temperature and pressure. Therefore, the preferred reaction conditions can be adjusted or tailored as necessary, while still taking advantage of the various aspects of the present invention. For example, if other factors favor carrying out the reaction at a temperature at which the volatility of the products is relatively lower, the ambient pressure can be reduced to encourage the volatile species to exit the solution and drive the reaction in the intended direction. In any case, so long as the by-products are generally more volatile than the reagents themselves, the imidization reaction will be encouraged to proceed in the intended manner.

Another alternative qualifying characteristic is that the hydrophilic reagent will react with water to produce a solvent molecule. Again, the production of such a molecule effectively removes water from the polyamic acid-polyimide equilibrium scheme so that in accordance with LeChatelier's principle, the accompanying use of water becomes a stress upon the equilibrium to which the equilibrium adjusts to relieve the stress, in this case, by producing more water. Because the polyamic acid-polyimide system produces water whenever it produces polyimide, the overall result is to foster the continued production of polyimide at favorable moderate temperatures.

In preferred embodiments, the method comprises adding an acetal (including hemiacetals), a ketal, or an organic carbonate as the hydrophilic reagent. Although the inventors do not wish to be limited by any particular reaction scheme, it has been hypothesized that these compounds react directly with the water molecule produced by the imidization of the polyamic acid to produce a relatively small, volatile molecule. Also, it will be understood that mixtures of exemplary hydrophilic reagents can be used in place of a single hydrophilic reagent, depending in either case, upon the other appropriate circumstances.

In this regard, acetals and ketals can be generally categorized as organic compounds in which two ether functional groups are present on a single carbon atom. Acetals and ketals have some functional group characteristics that they share with ethers, but differ from ethers in that they undergo acidic cleavage with extreme ease; i.e., illustrated generally:

$$Acetal + H_2O \rightarrow Aldehyde + Alcohol$$

$$Ketal + H_2O \rightarrow Ketone + Alcohol$$

For example, an acetal such as 2,2-dimethyloxypropane will react with water to form acetone and methanol. Both of these compounds are more volatile than the original reagent and thus drive the reaction in their direction.

Carbonates are characterized as the reaction product of carbonic acid ($H_2CO_3$) with a metal or an organic compound. Carbonic acid is bifunctional and thus its derivatives are often bifunctional as well. Preferably, the carbonates used in conjunction with the present invention include both of the functional oxygens in the carbonate radical ($CO_3^{-2}$) so that one of the compounds produced when the carbonate reacts is gaseous carbon dioxide ($CO_2$).

As an example, an organic carbonate such as dimethylcarbonate will similarly react with water to form carbon dioxide gas and methanol. The carbon dioxide gas will generally exit on its own under most typical reaction conditions at room temperature or above. A portion of the methanol will likewise evaporate, while the remainder can be distilled off at moderate temperatures which do not affect the remaining polyimide.

Suitable acetals and ketals include the following: 3,3-dimethoxy-2-butanone; acetaldehyde dimethyl acetal; (±)-acetaldehyde ethyl propargyl acetal; 4,4-dimethoxy-2,5-cyclohexadien-1-one; N,N-dimethylaetamide dimethyl acetal (this will react with water to produce a solvent molecule and two methanol molecules); 1-methyl-2-pyrrolidinone dimethyl acetal (this also produces a solvent by-product); dimethylaminoacetaldehyde dimethyl acetal; aminoacetaldehyde diethyl acetal; aminoacetaldehyde dimethylacetal; methylaminoacetaldehyde dimethyl acetal; dimethoxymethane; 2,2-dimethoxy-2-phenylacetephenone; 2,2-dimethoxypropane; acrolein dimethyl acetal; acrolein diethyl acetal; 5,5-dimethoxy-1,2,3,4-tetrachlorocyclopentadiene; N,N-dimethylformamide dimethyl acetal (this compound reacts with water to form dimethyl formamide; another good solvent for polyamic acids and polyamides); N,N-dimethylformamide ditertbutyl acetal; N,N-dimethylformamide di-cyclohexyl acetal; N,N-dimethylformamide diethyl acetal; N,N-dimethylformamide diisopropyl acetal; N,N-dimethylformamide dineopentyl acetal; N,N-dimethylformamide dipropyl acetal.

Suitable organic carbonates include the following: diethyl carbonate; dimethyl carbonate; diphenyl carbonate; dipropyl carbonate; ethylene carbonate; and propylene carbonate.

The polyamic acid used to produce the polyimide in the present invention can in turn be formed by the step of reacting a primary diamine with a tetracarboxylic acid dianhydride to produce polyamic acid prior to the step of curing the polyamic acid into polyimide. Alternatively, the step can comprise reacting the primary diamine with a tetracarboxylic acid that is itself capable of forming a dianhydride to produce polyamic acid. Such tetracarboxylic acids can generally be qualified as those having two pairs of acid groups and in which each pair comprises acid groups on adjacent carbon atoms.

Suitable tetracarboxylic dianhydrides include the following: 1,2,4,5-benzenetetracarboxylic dianhydride; 3,3',4,4'-benzophenonetetracarboxlyic dianhydride; 1,2,3,4-cyclobutanetetracarboxylic dianhydride; 1,4,5,8-napthalenetetracarboxylic dianhydride; 3,4,9,10-perylenetetracarboxylic dianhydride; tetrahydrofuran-2,3,4,5-tetracarboxylic dianhydride; ethylenediaminetetraacetic dianhydride; and bicyclo[2.2.2]oct-7-ene-2,3,5,6-tetracarboxylic dinhydride. Fully or partially fluorinated derivatives of these compounds are likewise suitable.

Suitable tetracarboxylic acids that are capable of forming a dianhydride include the appropriate analogous acids: 1,2,4,5-benzenetetracarboxylic acid; 3,3',4,4'-benzophenonetetracarboxlyic acid; 1,2,3,4-cyclobutanetetracarboxylic acid; 1,4,5,8-napthalenetetracarboxylic acid; 3,4,9,10-perylenetetracarboxylic acid; tetrahydrofuran-2,3,4,5-tetracarboxylic acid; ethylenediaminetetraacetic acid; and bicyclo[2.2.2]oct-7-ene-2,3,5,6-tetracarboxylic acid. Fully or partially fluorinated derivatives of these compounds are likewise suitable.

As understood by those familiar with the chemistry of these compounds, this represents an exemplary group of compounds rather than a limiting one, and it will be understood that other suitable tetracarboxylic acids and tetracarboxylic acid dianhydrides can be incorporated into the present invention without undue experimentation.

The other component of the polyamic acid is the amine, which must be a diamine, and in particular a primary diamine. It will be understood, however, that molecules with three amine groups; i.e. primary triamines; also can be classified and used for purposes of the present invention.

In particular, the step of reacting a primary diamine can comprise reacting an aromatic or aliphatic diamine, and a suitable list of aromatic and aliphatic diamines for use in the present invention is as follows: 4-aminophenylether; 2,6-diaminoanthraquinone; 1,2-diaminoethane; 1,3-diaminopropane; 1,4-diaminobutane; 1,5-diaminopentane; 1,6-diaminohexane; 1,7-diaminoheptane; 1,8-diaminooctane; 1,9-diaminononane; 1,2-diaminocyclohexane; 1,4-diaminocyclohexane; 2,7-diaminofluorene; 1,5-diaminonapthalene; pararosaniline, bis(paminophenoxy)dimethylsilane; 1,3-bis(3-aminopropyl)-1,3-bis(trimethylsiloxy)-1,3-dimethoxydisiloxane; 1,3-bis(3-aminopropyl)-1,1,3,3-tetramethyldisiloxane; and 1,4-bis(3-aminopropyldimethylsilyl)benzene. Fully or partially fluorinated derivatives of these compounds are likewise suitable.

It will be understood with respect to the amine precursor that this list is likewise exemplary rather than limiting and that those skilled in the art will be able to select additional amines for this purpose that are encompassed by the present invention and the claims recited herein.

In another embodiment, the invention comprises the step of curing polyamic acid into polyimide by reacting a primary diamine with a tetracarboxylic acid dianhydride in the presence of the hydrophilic reagent. In other words, the hydrophilic reagent can be used during the step of preparing the polyamic acid. Although the net reaction remains the same, the use of the reagent at an earlier step can be advantageous under certain circumstances.

In another aspect, the invention is a polyimide solution for which the planarizing characteristics are favorably improved over the planarizing characteristics of polyimide films conventionally formed from polyamic acid solutions. The invention, by reducing the concentration of polyamic acid in solution in favor of the polyimide, reduces the amount of compound present that is significantly affected by hydrogen bonding. In particular, polyamic acid is quite susceptible to hydrogen bonding between the acid hydrogen and the amide nitrogen This increases the interand intramolecular hydrogen bonding in polyamic acid solutions. This in turn increases their viscosity and correspondingly decreases the planarizing characteristics of any given solution.

In contrast, by using the present invention, the percentage of polyamic acid in any given solution is greatly decreased, and the amount of polyimide—which is not susceptible to hydrogen bonding—is increased. Thus, for any given solution of polyamic acid and polyimide formed using the present invention, the viscosity will be lower, and the planarizing characteristics will be better. It will be understood by those familiar with such solutions and their characteristics that this means that the viscosity using the invention will be lower for any given proportion of solvent, or, that the viscosity can be maintained at a given value while the proportion of solids is raised. In the former situation, this means that the planarizing qualities of a solution of a given concentration will be better than those of a conventionally prepared solution of the same concentration. In the latter case, reaction temperatures, or times, or both can be reduced because of the smaller proportion of solvent to be removed.

Figure 2:
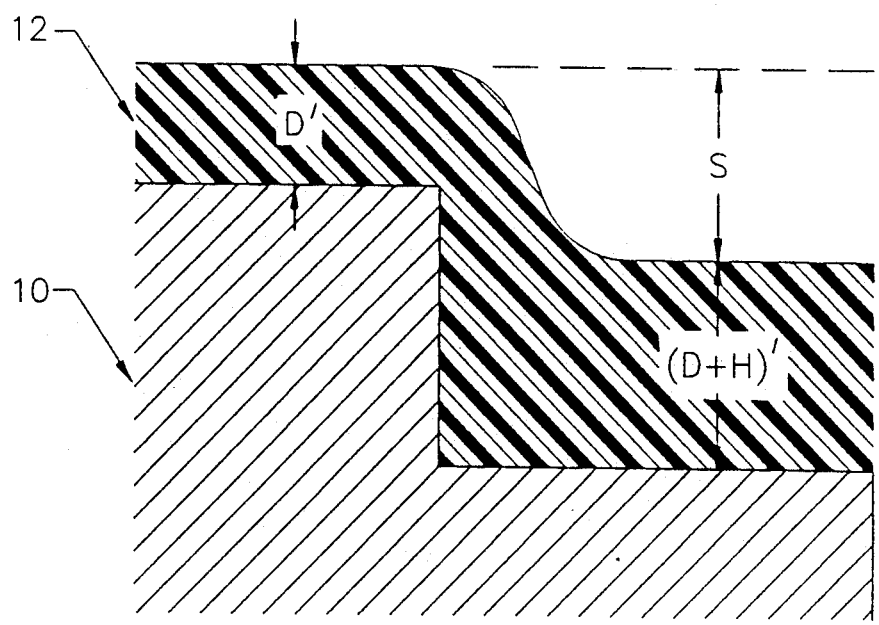
FIG. 2 i a diagram of the substrate and topography after the solvent has been partially or totally removed from the applied film.

FIGS. 1 and 2 illustrate the relation between the fraction of dissolved solids and planarization. FIG. 1 represents a liquid material (such as the polyimide solution) that has been spun cast on a substrate 10 that possesses topography represented in turn by the step 11 of height H. The film 12 at this point is still basically a liquid and rises a distance D above the step. As solvent evaporates, the film 12 shrinks in volume and thickness. The amount of shrinkage is approximately proportional to the fraction of solvent in the cast film. The fraction of solvent is, in turn, equal to 1-P where P is the fraction of dissolved solids.

FIG. 2 illustrates the situation after solvent evaporation. The residual lack of planarity S is given by:

$$S = D' + H - (D + H)$$

$$S = [D - (1-P)D] + H - [(D+H) - (1-P)(D+H)]$$

$$S = (1-P)H \qquad \text{(Equation 1)}$$

Equation 1 demonstrates that if the fraction of dissolved solids P is large, then S will be small and the film will be effective in planarization. Because viscosity is reduced by the invention described herein, the fraction of solids that can be accommodated in solution is larger than for polyamic acid. In other words, for solutions of equal viscosity, the material of the invention will lead to better planarization than will a solution of polyamic acid.

Those familiar with viscosity will understand that this discussion is somewhat simplified by the assumption that the solution illustrated in FIG. 1 is an ideal solution with zero viscosity. Any real solution will show some viscosity and a resulting residual step over the substrate topography even in the liquid state.

The second, or imidization, step in curing polyamic acid films to solid polyimide also causes the film to shrink and become more conformable and hence less planarizing. The curing of polyamic acid to polyimide in solution means that the imidization step is achieved prior to the application of the film. As a result, no further loss in planarity is associated with the imidization reaction once the solvent is volatilized from these solution-cured polyimide films.

The following specific examples are illustrative of the present invention:

Procedure 1. A chemically cured polyimide solution in dimethylacetamide (DMA) is prepared according to the following procedure. In a reflux apparatus 1.76 grams of 4-aminophenylether (orthodianaline, ODA) and 1.96 grams of 1,2,4,5-benzene-tetrocarboxylic anhydride (pyromylitic dianhydride (PMDA)) are added to 21.1 grams of DMA with stirring under nitrogen. To this solution is added 2.0 ml of 2,2-dimethoxypropane. Stirring is continued under nitrogen atmosphere and the temperature gradually raised to about 90° C. (over approximately one hour) with an oil bath. After the reaction mixture has been heated at about 90° C. for three to four hours under nitrogen, the nitrogen flow is increased to reduce the solution volume to the volume of the reaction mixture prior to the addition of the 2,2-dimethoxypropane. At this point the solution is 15 percent by weight in polyimide. The reaction mixture is then cooled to room temperature under dry nitrogen and capped for later use.

Procedure 2. Modified Dupont PI2610, chemically cured polyimide is prepared by heating 100 ml of Dupont PI2610 with 20 ml of 2,2-dimethoxypropane at about 90° C. in a reflux apparatus. The reaction mixture is stirred and heated under dry nitrogen for three to four hours and then the volume of the heated (90° C.) reaction mixture is reduced to 100 ml in a stream of dry nitrogen. The reaction mixture is then cooled to room temperature under dry nitrogen and capped for later use. DuPont PI2610 is a polyamic acid solution available from DuPont Company, DuPont Electronics, P.O. Box 80030, Wilmington, Del., 19880-0030.

Procedure 3. Modified Dupont PI2540 is prepared by heating 100 ml of Dupont PI2540 with 20 ml of dimethylcarbonate according to the previous procedure. DuPont PI2540 is also a polyamic acid solution available from DuPont at the address indicated above.

Polyimides films formed from these solutions can all be advantageously cured at temperatures of between about 250° and 300° C., well below typical curing temperatures of 400° C. or higher.

Using such procedures, and in order to form polyimide films of varying thicknesses, the solution volume can be reduced below that of the original polyamic acid solution to produce a chemically cured polyamide solution of the required viscosity.

It will be further understood that in addition to providing a method for preparing and curing low viscosity, highly planarizing polyimide solutions, the invention further comprises a precursor solution from which a low viscosity, highly planarizing polyimide solution can be formed at the moderate temperatures. In this embodiment, the invention comprises a polyamic acid that is the adduct product of a primary diamine and a compound selected from the group consisting of tetracarboxylic anhydrides and tetracarboxylic acids that are capable of forming dianhydrides. The solution also includes the hydrophilic reagent that has little or no reactivity with the amines or carboxylic acids and that is of the type that will react with water to shift the equilibrium reaction between polyamic acid and polyamide toward the production of polyamide. In this manner, the precursor solution can be driven to produce polyimide at moderate temperatures as the by-products use the water produced in the equilibrium between polyamic acid and polyimide and drive the equilibrium towards the polyimide production.

In yet another embodiment, the invention comprises a method of planarizing the surface of a microelectronic device such as a integrated circuit or its precursor. In this embodiment, the invention comprises applying a polyimide precursor solution as a film to the surface of the microelectronic device, wherein the solution is a low viscosity, highly planarizing polyimide solution that can form a highly planar polyimide film on the device structure. The solution comprises the polyamic acid as described earlier, and the hydrophilic reagent as set forth herein. Finally, the method comprises removing solvent from the solution to produce a solid, highly planar layer of polyimide upon the surface of the microelectronic structure.

In yet another embodiment, the invention comprises a precursor for a microelectronic device such as a integrated circuit. In this embodiment, the invention comprises a microelectronic structure having device and device precursor geometries thereon and a solution applied as a film to the microelectronic structure in which the solution is curable into a low viscosity, highly planarizing polyimide solution that can form a highly planar polyimide layer on the device structure. The solution further comprises the polyamic acid and the hydrophilic reagent as defined herein with respect to the embodiments of the invention already described.

As set forth in the Background portion of the Specification, polyimides have wide applicability in many areas outside of the field of microelectronic device structures and their fabrication. Therefore, although the invention has been described with respect to microelectronic devices and their manufacture, it will be understood by those of ordinary skill in this art that the curing scheme set forth herein is not limited to this field but can be applied in a number of other polyimide uses and techniques while still being encompassed by the present invention.

In the specification and drawings, there have been described typical preferred embodiments of the invention, and although specific terms have been employed, they have been used in a generic and descriptive sense only and not purposes of limitation, the scope of the invention being set forth in the following claims.

That which is claimed is:

1. A method of preparing low viscosity, highly planarizing polyimide solutions which can be thermally cured to form polyimide films at moderate temperatures as low as 250°–300° C. for use in microelectronic applications and comprising:

chemically curing polyamic acid into polyimide by adding a hydrophilic reagent to a polyamic acid solution, wherein the hydrophilic reagent has little or no reactivity with amines or carboxylic acids and is added to the polyamic acid solution in an amount sufficient to remove the water normally produced by the imidization of polyamic acid to polyimide by reacting with the water to form byproducts that have similar or lower boiling points than the hydrophilic reagent itself to thereby shift the equilibrium of the imidization reaction forward to thereby encourage the formation of polyimide in the solution.

2. A method according to claim 1 wherein the step of adding the hydrophilic reagent comprises adding a hydrophilic reagent that will react with water to form a solvent in which polyamic acid and polyimide are both soluble.

3. A method according to claim 1 wherein the step of adding the hydrophilic reagent comprises adding a hydrophilic reagent that will react with water to form a compound that is volatile at room temp or above.

4. A method according to claim 1 wherein the step of adding the hydrophilic reagent comprises adding a hydrophilic reagent that will react with water to form a compound that is a gas.

5. A method according to claim 1 further comprising the step of reacting a primary diamine with a tetracarboxylic acid dianhydride to produce polyamic acid prior to the step of curing the polyamic acid into polyimide.

6. A method according to claim 1 wherein the step of curing polyamic acid into polyimide comprises reacting a primary diamine with a tetracarboxylic acid dianhydride in the presence of the hydrophilic reagent.

7. A method according to claim 1 further comprising the step of reacting a primary diamine with a tetracarboxylic acid that is capable of forming a dianhydride to produce polyamic acid prior to the step of curing the polyamic acid into polyimide.

8. A method according to claim 7 wherein the step of reacting a tetracarboxylic acid that is capable of forming a dianhydride comprises reacting a tetracarboxylic acid having two pairs of acid groups, and in which each pair comprises acid groups on adjacent carbon atoms.

9. A method according to claim 5 or 7 wherein the step of reacting a primary diamine comprises reacting an aromatic diamine.

10. A method according to claim 1 wherein the step of reacting a primary diamine comprises reacting a primary diamine selected from the group consisting of: 4-aminophenylether; 2,6-diaminoanthraquinone; 1,2-diaminoethane; 1,3-diaminopropane; 1,4-diaminobutane; 1,5-diaminopentane; 1,6-diaminohexane; 1,7-diaminoheptane; 1,8-diaminooctane; 1,9-diaminononane; 1,2-diaminocyclohexane; 1,4-diaminocyclohexane; 2,7-diaminofluorene; 1,5-diaminonapthalene; pararosaniline, bis(p-aminophenoxy)dimethylsilane; 1,3-bis(3-aminopropyl)-1,3-bis(trimethylsiloxy)-1,3-dimethoxydisiloxane; 1,3-bis(3-aminopropyl) -1,1,3,3-tetramethyldisiloxane; and 1,4-bis(3-aminopropyldimethylsilyl)benzene.

11. A method according to claim 5 wherein the step of reacting a tetracarboxylic acid dianhydride comprises reacting a tetracarboxylic acid dianhydride selected from the group consisting of: 1,2,4,5-benzenetetracarboxylic dianhydride; 3,3',4,4'-benzophenonetetracarboxlyic dianhydride; 1,2,3,4-cyclobutanetetracarboxylic dianhydride; 1,4,5,8-napthalenetetracarboxylic dianhydride; 3,4,9,10-perylenetetracarboxylic dianhydride; tetrahydrofuran-2,3,4,5-tetracarboxylic dianhydride; ethylenediaminetetraacetic dianhydride; and bicyclo[2.2.2]oct-7-ene-2,3,5,6-tetracarboxylic dianhydride.

12. A method according to claim 7 wherein the step of reacting a tetracarboxylic acid that is capable of forming a dianhydride comprises reacting a tetracarboxylic acid selected from the group consisting of: 1,2,4,5-benzenetetracarboxylic acid; 3,3',4,4'-benzophenonetetracarboxlyic acid; 1,2,3,4-cyclobutanetetracarboxylic acid; 1,4,5,8-napthalenetetracarboxylic acid; 3,4,9,10-perylenetetracarboxylic acid; tetrahydrofuran-2,3,4,5-tetracarboxylic acid; ethylenediaminetetraacetic acid; and bicyclo[2.2.2]oct-7-ene-2,3,5,6-tetracarboxylic acid.

13. A method according to claim 1 wherein the step of adding a hydrophilic reagent to a polyamic acid solution comprises adding an acetal or a ketal.

14. A method according to claim 13 wherein the step of adding an acetal comprises adding a hemiacetal.

15. A method according to claim 1 wherein the step of adding a hydrophilic reagent to a polyamic acid solution comprises adding a reagent selected from the group consisting of organic carbonates.

16. A method of preparing low viscosity, highly planarizing polyimide solutions which can be thermally cured to form polyimide films at moderate temperatures as low as 250°-300° C. for use in microelectronic applications and comprising:

chemically curing polyamic acid into polyimide by adding an acetal or a ketal to a polyamic acid solution, wherein the acetal or ketal has little or no reactivity with amines or carboxylic acid and is added to the polyamic acid solution in an amount sufficient to remove the water normally produced by the imidization of polyamic acid to polyimide by reacting with the water to form byproducts that have similar or lower boiling points than the hydrophilic reagent itself to thereby shift the equilibrium of the imidization reaction forward to thereby encourage the formation of polyimide in the solution.

17. A method according to claim 16 wherein the step of adding the acetal or ketal comprises adding an acetal that reacts with water to form an aldehyde and an alcohol.

18. A method according to claim 16 wherein the step of adding the acetal or ketal comprises adding a ketal that reacts with water to form a ketone and an alcohol.

19. A method according to claim 16 wherein the step of adding an acetal or ketal comprises adding a reagent from the group consisting of: 3,3-dimethoxy-2-butanone; acetaldehyde dimethyl acetal; (±)-acetaldehyde ethyl propargyl acetal; 4,4-dimethoxy-2,5-cyclohexadien-1-one; N,N-dimethylacetamide dimethyl acetal; 1-methyl-2-pyrrolidinone dimethyl acetal; dimethylaminoacetaldehyde dimethyl acetal; aminoacetaldehyde diethyl acetal; aminoacetaldehyde dimethylacetal; methylaminoacetaldehyde dimethyl acetal; dimethoxymethane; 2,2-dimethoxy-2-phenylacetephenone; 2,2-dimethoxypropane; acrolein dimethyl acetal; acrolein diethyl acetal; 5,5-dimethoxy-1,2,3,4-tetrachlorocyclopentadiene; N,N-dimethylformamide dimethyl acetal; N,N-dimethylformamide ditertbutyl acetal; N,N-dimethylformamide di-cyclohexyl acetal; N,N-dimethylformamide diethyl acetal; N,N-dimethylformamide diisopropyl acetal; N,N-dimethylformamide dineopentyl acetal; and N,N-dimethylformamide dipropyl acetal.

20. A method according to claim 16 wherein the step of curing the polyamic acid into polyimide further comprises:

casting the polyamic acid solution as a film; and
heating the film cast from the polyamic acid solution to a temperature of between about 250° C. and 300° C. for a time sufficient to remove solvent from the polyimide.

21. A method of preparing low viscosity, highly planarizing polyimide solutions which can be thermally cured to form polyimide films at moderate temperatures as low as 250°-300° C. for use in microelectronic applications and comprising:

chemically curing polyamic acid into polyimide by adding a carbonate to a polyamic acid solution,
wherein the carbonate has little or no reactivity with amines or carboxylic acid and is added to the polyamic acid solution in an amount sufficient to remove the water normally produced by the imidization of polyamic acid to polyimide by reacting with the water to form byproducts that have similar or lower boiling points than the hydrophilic reagent itself to thereby shift the equilibrium of the imidization reaction forward to thereby encourage the formation of polyimide in the solution.

22. A method according to claim 21 wherein the step of adding the carbonate comprises adding a carbonate that reacts with water to form carbon dioxide and an alcohol.

23. A method according to claim 21 wherein the step of adding an organic carbonate comprises adding an organic carbonate selected from the group consisting of: diethyl carbonate, dimethyl carbonate, diphenyl carbonate, dipropyl carbonate, ethylene carbonate, and propylene carbonate.

24. A precursor solution from which a low viscosity, highly planarizing polyimide solution can be formed at moderate temperatures, said precursor solution comprising:

a polyamic acid that is the adduct product of a primary diamine and a compound selected from the group consisting of tetracarboxylic anhydrides and tetracarboxylic acids that are capable of forming dianhydrides; and a hydrophilic reagent that has little or no reactivity with amines or carboxylic acids and reacts with the water produced in equilibrium amounts in the equilibrium between polyamic acid and polyimide to produce by-products that shift the equilibrium in favor of the production of polyimide so that the production of said by-products and the associated removal of water drives the polyamic acid dehydration reaction to produce polyimide at moderate temperatures.

25. A solution according to claim 24 wherein said primary diamine comprises an aromatic diamine 26. A solution according to claim 24 wherein said primary diamine comprises a primary diamine selected from the group consisting of: 4-aminophenylether; 2,6-diaminoanthraquinone; 1,2-diaminoethane; 1,3-diaminopropane; 1,4-diaminobutane; 1,5-diaminopentane; 1,6-diaminohexane; 1,7-diaminoheptane; 1,8-diaminooctane; 1,9-diaminononane; 1,2-diaminocyclohexane; 1,4-diaminocyclohexane; 2,7-diaminofluorene; 1,5-diaminonapthalene; pararosaniline, bis(p-aminophenoxy)dimethylsilane; 1,3-bis(3-aminopropyl)-1,3-bis(trimethylsiloxy) -1,3-dimethoxydisiloxane; 1,3-bis(3-aminopropyl) -1,1,3,3-tetramethyldisiloxane; and 1,4-bis(3-aminopropyldimethylsilyl)benzene.

27. A solution according to claim 24 wherein said tetracarboxylic dianhydride is selected from the group consisting of: 1,2,4,5-benzenetetracarboxylic dianhydride; 3,3',4,4'-benzophenonetetracarboxlyic dianhydride; 1,2,3,4-cyclobutanetetracarboxylic dianhydride; 1,4,5,8-napthalenetetracarboxylic dianhydride; 3,4,9,10-perylenetetracarboxylic dianhydride; tetrahydrofuran-2,3,4,5-tetracarboxylic dianhydride; ethylenediaminetetraacetic dianhydride; and bicyclo[2.2.2]oct-7-ene-2,3,5,6-tetracarboxylic dianhydride.

28. A solution according to claim 24 wherein said tetracarboxylic acid that is capable of forming a dianhydride is selected from the group consisting of: 1,2,4,5-benzenetetracarboxylic acid; 3,3',4,4'-benzophenonetetracarboxlyic acid; 1,2,3,4-cyclobutanetetracarboxylic acid; 1,4,5,8-napthalenetetracarboxylic acid; 3,4,9,10-perylenetetracarboxylic acid; tetrahydrofuran-2,3,4,5-tetracarboxylic acid; ethylenediaminetetraacetic acid; and bicyclo[2.2.2]oct-7-ene-2,3,5,6-tetracarboxylic acid.

29. A solution according to claim 24 wherein said hydrophilic reagent comprises an acetal.

30. A solution according to claim 29 wherein said acetal comprises a hemiacetal.

31. A solution according to claim 24 wherein said hydrophilic reagent to a polyamic acid solution comprises an organic carbonate.

32. A solution according to claim 29 wherein said acetal comprises an acetal that reacts with water to form an aldehyde and an alcohol.

33. A solution according to claim 29 wherein said acetal is selected from the group consisting of: 3,3-dimethoxy-2-butanone; acetaldehyde dimethyl acetal; (±)-acetaldehyde ethyl propargyl acetal; 4,4-dimethoxy-2,5-cyclohexadien-1-one; N,N-dimethylaetamide dimethyl acetal; 1-methyl-2-pyrrolidinone dimethyl acetal; dimethylaminoacetaldehyde dimethyl acetal; aminoacetaldehyde diethyl acetal; aminoacetaldehyde dimethylacetal; methylaminoacetaldehyde dimethyl acetal; dimethoxymethane; 2,2-dimethoxy-2-phenylacetephenone; 2,2-dimethoxypropane; acrolein dimethyl acetal; acrolein diethyl acetal; 5,5-dimethoxy-1,2,3,4-tetrachlorocyclopentadiene; N,N-dimethylformamide dimethyl acetal; N,N-dimethylformamide di-tertbutyl acetal; N,N-dimethylformamide di-cyclohexyl acetal; N,N-dimethylformamide diethyl acetal; N,N-dimethylformamide diisopropyl acetal; N,N-dimethylformamide dineopentyl acetal; and N,N-dimethylformamide dipropyl acetal.

34. A solution according to claim 31 wherein said organic carbonate comprises a carbonate that reacts with water to form carbon dioxide and an alcohol.

35. A solution according to claim 31 wherein said organic carbonate is selected from the group consisting of: diethyl carbonate, dimethyl carbonate, diphenyl carbonate, dipropyl carbonate, ethylene carbonate, and propylene carbonate.

36. A method of planarizing the surface of a microelectronic device such as an integrated circuit or its precursor, the method comprising:

applying a low viscosity polyimide solution to the surface of the microelectronic device, wherein the applied solution is a highly planarizing polyimide film that can, upon thermal curing below 300° C., form a highly planar polyimide film on the device structure, said solution further comprising:

a polyamic acid that is the adduct product of a primary diamine and a compound selected from the group consisting of tetracarboxylic anhydrides and tetracarboxylic acids that are capable of forming dianhydrides; and a hydrophilic reagent that has little or no reactivity with amines or carboxylic acids and that removes the water normally produced by the imidization of polyamic acid to polyimide to thereby encourage the formation of polyimide in the solution so that the removal of water drives the polyamic acid dehydration reaction to produce polyimide at moderate temperatures; and removing solvent from the solution to produce a solid, highly planar layer of polyimide upon the surface of the microelectronic structure.

37. A method according to claim 36 wherein the step of removing solvent from the solution comprises heating the applied solution to a temperature of between about 250° and 300° C.

38. A method according to claim 36 wherein the step of applying the polyimide precursor solution comprises applying a polyimide precursor solution in which the hydrophilic reagent comprises an acetal.

39. A method according to claim 36 wherein the step of applying the polyimide precursor solution comprises applying a polyimide precursor solution in which the hydrophilic reagent comprises a carbonate.

40. A precursor for a microelectronic device such as an integrated circuit, said precursor comprising:

a microelectronic structure having device and device precursor geometries thereon; and a solution applied to said microelectronic structure in which the solution is of a low viscosity, and when applied is curable into a highly planarizing polyimide film that can form, upon thermal cure below 300° C., a highly planar polyimide film on the device structure, said solution further comprising:

a polyamic acid that is the adduct product of a primary diamine and a compound selected from the group consisting of tetracarboxylic anhydrides and tetracarboxylic acids that are capable of forming dianhydrides; and a hydrophilic reagent that has little or no reactivity with amines or carboxylic acids and that removes the water normally produced by the imidization of polyamic acid to polyimide to thereby encourage the formation of polyimide in the solution so that the removal of water drives the polyamic acid dehydration reaction to produce polyimide at moderate temperatures.

41. A precursor according to claim 40 wherein said hydrophilic reagent comprises an acetal.

42. A precursor according to claim 40 wherein said hydrophilic reagent comprises a carbonate.

* * * * *

UNITED STATES PATENT AND TRADEMARK OFFICE
CERTIFICATE OF CORRECTION

PATENT NO. : 5,248,760

DATED : September 28, 1993

INVENTOR(S) : DuBois, et al.

It is certified that error appears in the above-identified patent and that said Letters Patent is hereby corrected as shown below:

Column 1, line 20, insert a comma (",") after "C.)

Column 1, line 32, "Distionary" should be -- Dictionary

Column 1, line 52, "A" should be -- An --

Column 3, line 17, after "ought" insert -- to --

Column 4, line 1, "i" should be -- is --

Column 4, line 31, insert a period (".") after "reaction"

Column 7, line 16, "dinhydride" should be -- dianhydride -

Column 7, line 52, omit the dash (-) at the end of the line

Column 7, line 53, "paminophenoxy should be
 -- p-aminophenoxy --

Column 8, line 16, "interand" should be -- inter and --
 (two words)

Column 10, line 18, "a" should be -- an --

UNITED STATES PATENT AND TRADEMARK OFFICE
CERTIFICATE OF CORRECTION

PATENT NO. : 5,248,760
DATED : September 28, 1993
INVENTOR(S) : DuBois, et al.

It is certified that error appears in the above-identified patent and that said Letters Patent is hereby corrected as shown below:

Column 10, line 32, "a" (third occurrence) should be
-- an --

Column 10, line 58, after "not" insert -- for --

Column 11, line 20, "temp" should be -- temperature --

Column 12, line 55, "dimethylacetamide" should be
-- dimethylaetamide --

Signed and Sealed this

Twenty-sixth Day of April, 1994

Attest:

BRUCE LEHMAN

Attesting Officer   Commissioner of Patents and Trademarks